United States Patent
Cahill et al.

[11] Patent Number: 5,998,500
[45] Date of Patent: Dec. 7, 1999

[54] METHOD OF MAKING A FILTER WITH INTERPENETRATING POLYMER NETWORK THAT BIODEGRADES

[76] Inventors: Scott A. Cahill, 2788 Green St., San Francisco, Calif. 94123; Benjamin M. Chaloner-Gill, 620 Mansion Ct., No. 306, Santa Clara, Calif. 95054; Amin Hassan, 913 Calla Neuvo, San Clemente, Calif. 92673

[21] Appl. No.: 09/102,773

[22] Filed: Jun. 23, 1998

Related U.S. Application Data

[62] Division of application No. 08/777,870, Dec. 31, 1996, Pat. No. 5,817,159.

[51] Int. Cl.[6] .................................................. B01D 39/16
[52] U.S. Cl. ...................... 523/124; 55/528; 55/DIG. 5; 131/202; 131/328; 131/332; 442/411; 442/415
[58] Field of Search .......................... 55/528, 527, 385.8, 55/DIG. 5; 131/202, 328, 332; 442/411, 409, 415, 414; 523/124

[56] References Cited

U.S. PATENT DOCUMENTS

| | | | |
|---|---|---|---|
| 2,639,239 | 5/1953 | Elliott | 106/197 |
| 2,685,344 | 8/1954 | Bunzl | 55/528 |
| 2,780,228 | 2/1957 | Touey | 131/208 |
| 2,811,029 | 10/1957 | Conner | 66/172 |
| 2,916,038 | 12/1959 | Wade | 55/528 |
| 2,917,054 | 12/1959 | Touey | 131/208 |
| 2,966,157 | 12/1960 | Touey et al. | 131/208 |
| 2,978,785 | 4/1961 | Wenzell et al. | 28/72.2 |
| 2,979,433 | 4/1961 | MacHenry | 55/528 |
| 3,003,504 | 10/1961 | Touey et al. | 131/208 |
| 3,008,474 | 11/1961 | Touey et al. | 131/208 |
| 3,039,908 | 9/1962 | Parmele | 55/528 |
| 3,102,835 | 9/1963 | White | 156/29 |
| 3,144,024 | 8/1964 | Eichwald et al. | 131/208 |
| 3,144,025 | 8/1964 | Erlich | 131/208 |
| 3,190,295 | 6/1965 | Touey et al. | 131/208 |
| 3,227,164 | 1/1966 | Touey et al. | 131/208 |
| 3,229,699 | 1/1966 | Touey et al. | 131/208 |
| 3,271,220 | 9/1966 | Geen | 156/180 |
| 3,280,823 | 10/1966 | Bavley et al. | 131/10 |
| 3,346,682 | 10/1967 | Thomson | 264/93 |
| 3,365,354 | 1/1968 | Britton | 161/150 |
| 3,393,120 | 7/1968 | Touey et al. | 161/173 |
| 3,393,684 | 7/1968 | Touey et al. | 131/267 |
| 3,424,172 | 1/1969 | Neurath et al. | 131/267 |
| 3,424,173 | 1/1969 | Touey et al. | 131/267 |
| 3,492,998 | 2/1970 | Mascaro | 55/528 |
| 3,552,400 | 1/1971 | Berger et al. | 55/528 |
| 3,573,130 | 3/1971 | Vinton et al. | 156/305 |
| 3,589,364 | 6/1971 | Dean et al. | 128/284 |
| 3,595,245 | 7/1971 | Buntin et al. | 131/269 |
| 3,640,742 | 2/1972 | Touey et al. | 106/179 |
| 3,723,413 | 3/1973 | Chatterjee et al. | 260/232 |
| 3,734,841 | 5/1973 | Thomas | 204/67 |
| 3,880,173 | 4/1975 | Hill | 131/269 |
| 4,015,611 | 4/1977 | Holst et al. | 131/268 |
| 4,126,141 | 11/1978 | Grossman | 55/528 |
| 4,188,960 | 2/1980 | Morie et al. | 131/267 |
| 4,256,524 | 3/1981 | Hare | 442/411 |
| 4,261,373 | 4/1981 | Tamaoki et al. | 131/332 |
| 4,282,890 | 8/1981 | Howell, Jr. et al. | 131/332 |
| 4,306,059 | 12/1981 | Yokobayashi et al. | 536/1 |
| 4,350,173 | 9/1982 | Sirén | 131/332 |
| 4,379,465 | 4/1983 | Coq | 131/332 |
| 4,579,130 | 4/1986 | Coffman | 131/332 |
| 4,704,324 | 11/1987 | Davis et al. | 428/311.71 |

(List continued on next page.)

*Primary Examiner*—Duane S. Smith
*Attorney, Agent, or Firm*—Baker & Botts, L.L.P.

[57] ABSTRACT

This invention relates to a filter and a method of making a filter. The filter is made of randomly orientated fibers made from an interpenetrating network formed from at least two polymers which are substantially water soluble in their salt form and which ionically interact in an aqueous solution to form the interpenetrating network. The filter is made without organic solvents, particularly, volatile organic compounds, and the filter is sufficiently water soluble to biodegrade upon disposal. A desired use of the filter is a cigarette filter.

11 Claims, 1 Drawing Sheet

U.S. PATENT DOCUMENTS

| | | | |
|---|---|---|---|
| 4,729,389 | 3/1988 | Anderson | 131/331 |
| 4,729,390 | 3/1988 | Mumpower, II | 131/331 |
| 4,729,391 | 3/1988 | Woods et al. | 131/332 |
| 4,736,755 | 4/1988 | Oldham et al. | 131/270 |
| 4,844,970 | 7/1989 | Goldstein et al. | 442/409 |
| 4,869,950 | 9/1989 | Elsen et al. | 442/409 |
| 5,019,262 | 5/1991 | Wang | 210/490 |
| 5,025,812 | 6/1991 | Fagg et al. | 131/297 |
| 5,025,815 | 6/1991 | Hill et al. | 131/332 |
| 5,053,066 | 10/1991 | Hassenboehler | 55/528 |
| 5,063,945 | 11/1991 | Sugihara et al. | 131/332 |
| 5,076,295 | 12/1991 | Saintsing | 131/332 |
| 5,150,721 | 9/1992 | Lee et al. | 131/331 |
| 5,502,158 | 3/1996 | Sinclair et al. | 528/354 |
| 5,516,565 | 5/1996 | Matsumoto | 428/35.7 |
| 5,532,298 | 7/1996 | Monroe et al. | 524/13 |
| 5,618,622 | 4/1997 | Gillberg-laforce et al. | 428/357 |
| 5,633,342 | 5/1997 | Verser et al. | 528/335 |
| 5,663,288 | 9/1997 | Shinoda et al. | 528/354 |
| 5,664,586 | 9/1997 | Sinclair et al. | 131/331 |
| 5,665,824 | 9/1997 | Chang et al. | 525/185 |
| 5,667,574 | 9/1997 | Zhang | 106/209.1 |
| 5,692,527 | 12/1997 | Matsumura et al. | 131/345 |
| 5,700,344 | 12/1997 | Edgington et al. | 156/336 |
| 5,706,833 | 1/1998 | Tsugaya et al. | 131/332 |
| 5,709,227 | 1/1998 | Arzonico et al. | 131/341 |
| 5,714,230 | 2/1998 | Kameoka et al. | 428/141 |
| 5,720,967 | 2/1998 | Hall-Hibbits et al. | 424/405 |
| 5,722,433 | 3/1998 | Ishino et al. | 131/165 |
| 5,733,576 | 3/1998 | Chmelir | 424/488 |
| 5,753,724 | 5/1998 | Edgington et al. | 523/124 |
| 5,758,669 | 6/1998 | Taniguchi et al. | 131/340 |
| 5,760,118 | 6/1998 | Sinclair et al. | 524/306 |
| 5,763,098 | 9/1998 | Kameoka et al. | 428/481 |
| 5,763,513 | 6/1998 | Suzuki et al. | 524/230 |
| 5,766,748 | 6/1998 | Ikado et al. | 428/226 |
| 5,817,159 | 10/1998 | Cahill et al. | 55/528 |

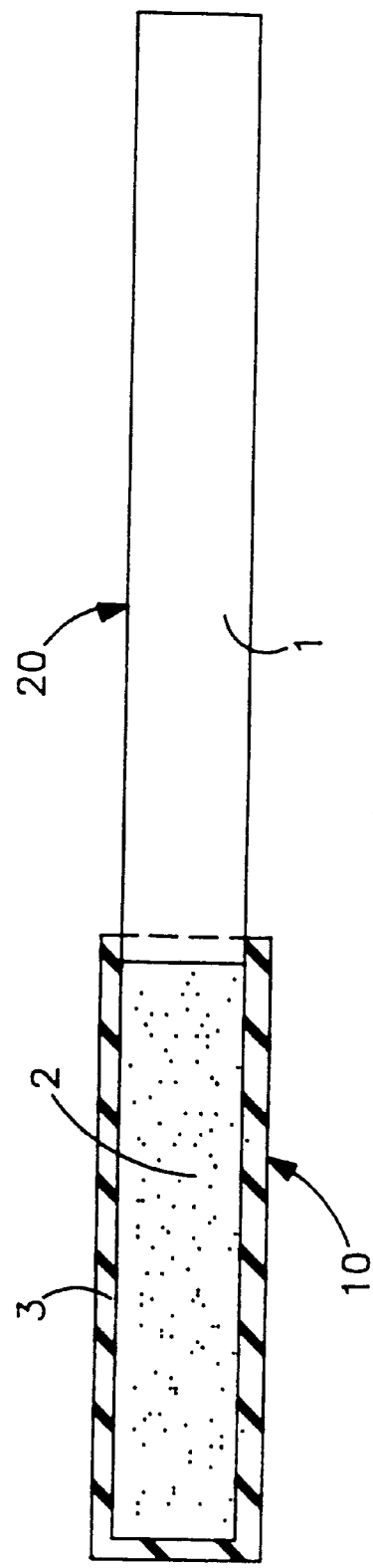

METHOD OF MAKING A FILTER WITH INTERPENETRATING POLYMER NETWORK THAT BIODEGRADES

This application is a divisional of application Ser. No. 08/777,870, filed Dec. 31, 1996, now U.S. Pat. No. 5,817,159, entitled FILTER WITH INTERPENETRATING POLYMER NETWORK THAT BIODEGRADES.

BACKGROUND OF THE INVENTION

1. Field of the Invention

This invention relates to a filter, and more particularly, to a filter (e.g., a cigarette filter) which is formed of an interpenetrating polymer network (IPN) made of at least two polymers which are substantially (readily) water soluble in their salt form and which ionically interact. The IPN is used to form fibers, which are in turn used to form a filter tow which, upon disposal following use, is sufficiently water soluble to break down under normal atmospheric conditions. This interaction makes the invention highly desirable for use in cigarette filters.

2. Description of the Related Art

Typical filters were initially composed of cellulose acetate (U.S. Pat. No. 2,917,054), cotton or paper fibers. Subsequent cross liking of celluloses (U.S. Pat. No. 4,350,173) include cellulose modified with isocyanates or high molecular weight fatty acids (U.S. Pat. No. 4,015,611), carboxylated cellulose (U.S. Pat. No. 3,589,364), and cellulose ethers or esters (U.S. Pat. Nos. 2,639,239; 3,723,413). Polyolefins have also been used (U.S. Pat. Nos. 2,780,228; 2,966,157; 3,144,025; 3,880,173; 4,261,373; 4,729,391; 5,063,945), as well as polyolefin copolymers (U.S. Pat. Nos. 3,393,120; 4,579,130), and polyesters of terephthalic acid and derivatives (U.S. Pat. No. 4,188,960).

The above processes generally use an external cross linker and solvent to achieve insolubility of the final fiber in water (the startup polymer generally also is not water soluble either). This is a drawback.

Bonding between the fibers of a filter is important to maximize the filtering capacity of the filter by providing a sufficiently tortuous flow path. Bonding is particularly important in filters where the polymers are made by extrusion or other techniques that result in a parallel orientation of the fibers, thus providing a very easy flow path for the smoke. Bonding also provides the filter with strength which allows easier manufacture and prevents the filter from disintegrating during use. Yet, the flow path through the filter cannot be so tortuous as to prevent the smoker from drawing air through the cigarette. Thus, the appropriate balance between filtration capacity and pressure drop must be maintained.

Examples of this kind of bonding between fibers, particularly cellulosic fibers, has been achieved with the use of plasticizers such as triacetin mixed with a dialkyl orthophthalate (U.S. Pat. No. 3,190,295), alkylene glycol and polyalkylene glycol esters of acetoacetic acid (U.S. Pat. No. 3,227,164), esterified improved plasticizer type hardening in phenol removing agents such as the esterified propionic acid esters of tri-, tetra-, and pentaethylene glycol (U.S. Pat. No. 3,393,684), polyethylene glycol diacetate (U.S. Pat. No. 3,229,699), glycerol triacetate and polyethylene glycol diacetate (U.S. Pat. No. 3,640,742).

Another method of bonding fibers is to use a mix of polymers, one of which is thermofusible. Thus, on heating the filter, one of the polymers melts creating the desired bonds (U.S. Pat. Nos. 4,261,373; 4,379,465; 4,579,130). Other methods of bonding fibers into nonwoven articles are described (U.S. Pat. Nos. 3,734,841; 2,811,029; 2,978,785; 3,102,835; 3,271,220; 3,365,354; 3,573,130).

Crimping of the fibers also contributes to a tortuous flow path and is often performed on filters to be used for cigarettes. Crimped cellulose acetate fibers may be bonded with nontacky essentially nonvolatile non-migrated organic plasticizers to increase rigidity (U.S. Pat. Nos. 3,003,504; 3,008,474). Crimping is also thought to be necessary for polyolefin fibers (U.S. Pat. No. 2,966,157).

Other methods of filter manufacture are known including meltblown nonwovens (U.S. Pat. Nos. 3,595,245; 5,053,066), folded or pleated polymer sheets (U.S. Pat. Nos. 3,346,682; 5,053,066), porous membranes (U.S. Pat. No. 5,019,262), and foamed cellulose (U.S. Pat. No. 4,282,890).

Other filter materials are also known such as kaolin fibers with a high alumina and silica content (U.S. Pat. No. 4,729,389). Other additives include fibers coated with additives such as organic compounds (U.S. Pat. No. 4,729,390), flour (U.S. Pat. No. 2,917,054), citric acid (U.S. Pat. Nos. 3,424,173; 3,424,172; 5,150,721), glycerin and tobacco extract (U.S. Pat. No. 5,076,295), flavor additives (U.S. Pat. No. 3,144,024) and nicotine (U.S. Pat. Nos. 3,280,823; 4,736,755).

Cellulosic polymers in filters have been at least partially replaced with polyolefin polymers. Specific polyolefins employed include polypropylene, polyethylene (U.S. Pat. Nos. 3,393,120; 4,379,465; 5,025,815), and polybutadiene, poly-1-butene, polyisobutylene, polyisoprene, poly-4-methyl-1-pentene or combinations thereof (U.S. Pat. No. 4,736,755). Polypropylene has also been mixed with thermofusible fibers such as polybutylene, polyethylene or copolymers or tripolymers thereof (U.S. Pat. No. 4,579,130).

Cellulose acetate filters generally require the use of relatively costly plasticizers such as triacetin to provide the desirable bonding between the fibers of the filter. Additional costs are incurred to handle and dispose the hazardous solvent, remove the solvent from the final product and dispose of waste solvent. The use of organic solvents in the manufacturing of cigarette filters present other problems as well. Trace organic solvents, left on the cigarette filter present health concerns, especially in light of the cigarette filter being held in the user's mouth with hot gases being drawn through the filter. Additionally, the use and disposal of organic solvents and the Volative Organic Compounds (VOCs) which can be created from their use, present environmental concerns relating to environmental contamination.

Crimping increases the bulk of the filter materials and the filtration capacity of a filter. However, it requires an additional manufacturing step and also decreases the strength of the filter fibers. This loss of strength can lead to increased difficulty and expense in shaping the filters to a desired form.

Although polyolefins have certain advantages over cellulose tows, they are not susceptible to bonding with conventional high boiling plasticizers. Instead, thermofusible polymers generally must be mixed with the polyolefin. Filters of this type must be subjected to an expensive heating step to create the desired bonds. Polyolefins can also be bonded by mixing with a plasticizer sensitive polymer. However, this leads to the use of expensive plasticizers as discussed above.

Furthermore, polyolefins generally have very smooth surfaces that decrease the filtration capacity of the fiber. Fibrillation and similar techniques have been used to increase the surface area, tortuousness of flow path and filtration capability of polyolefin filters. Unfortunately, these techniques are also time consuming, expensive and may weaken the fibers.

The known fibers discussed above, and particularly the polyolefin filters, suffer from the significant shortcoming that they do not biodegrade after the cigarette is smoked and the filter is discarded. Thus a used cigarette filter discarded on the ground remains an eyesore and environmental problem. Various other drawbacks also exist.

SUMMARY OF THE INVENTION

It is an object of the invention to overcome these and other drawbacks of the prior art.

It is another object of the invention to provide a filter, and particularly a cigarette filter, that will biodegrade upon being discarded.

It is another object of the invention to provide a filter that is manufactured by a process which does not use or maximizes the use of organic solvents and does not produce or minimizes the production of Volatile Organic Compounds (VOCs) in the manufacturing process.

It is another object of the invention to provide a cigarette filter that is easily manufactured and provides increased filtration rates over known filters.

To accomplish these and other objects of the invention, one embodiment of the invention relates to a filter and a method of making a filter which is aqueous-based and avoids the use of organic solvents and the resultant possible emission of VOCs and, thus, avoids the manufacturing, health and environmental concerns related to the emission of VOCs. Additionally, the filter will biodegrade and be dissolved or disintegrate after its intended use.

More specifically, one aspect of the invention relates to a filter tow of an Interpenetrating Polymer Network (IPN) formed of at least two polymers which are substantially water soluble in their salt form and which ionically interact. These two polymers are designated Polymer I and Polymer II. Polymer I, preferably an anionic polymer, preferably is water soluble and in its salt form, (e.g., NaA), the sodium salt in this case. The monomer of Polymer II preferably is cationic, and preferably is also water soluble and in its salt form. The two polymers are connected or bonded by ionic interactions to form the IPN. The IPN is used to form fibers, which are in turn used to form the filter tow which, upon disposal following use, is sufficiently water soluble to biodegrade.

BRIEF DESCRIPTION OF THE DRAWING

For a more complete understanding of the present invention, and the advantages thereof, reference is now made to the following descriptions taken in conjunction with the accompanying drawing, in which:

FIG. 1 is a longitudinal sectional view of a cigarette having a cigarette filter according to one embodiment of the present invention.

DETAILED DESCRIPTION OF THE PREFERRED EMBODIMENTS

The preferred embodiments of the present invention and its advantages are best understood by reference to FIG. 1. FIG. 1 shows a cigarette 20 having a tobacco section 1 and a filter section 10 which has a tow 2 and a sheath 3.

As used herein, the term "Interpenetrating Polymer Network (EPN)" generally relates to polymer blends in which the polymers exist in a network that is formed when at least one of the polymers is synthesized in the presence of the other. The interpenetrating polymer networks described herein preferably are sufficiently water soluble to biodegrade.

"Biodegrade" as used herein generally refers to the ability of a material to decay and become absorbed into the environment. Biodegrade is to be distinguished from "biodegradable", which refers to a material which is capable of decaying through action by living organisms. The filters described herein are sufficiently water soluble to biodegrade, i.e., upon being disposed after use, the filters absorb water, which initiates the breaking down of the material and dissipation or disintegration into the environment.

The cigarette filters of the present invention preferably have one or more of the following characteristics;

1. an acceptable level of draw resistance, i.e., pressure drop;
2. can be manufactured economically;
3. be of sufficient firmness to avoid collapsing during smoking and ease the handling during the manufacture of the filter;
4. not unduly affect the taste and aroma of tobacco smoke;
5. non-toxic;
6. manufactured in an environmentally responsible manner;
7. stable to storage and the levels of heat and moisture associated with smoking; and
8. no trace of solvents in the filters.

To achieve these and other benefits, the present invention provides a filter tow of an IPN formed of at least two polymers which are substantially water soluble in their salt form and which ionically interact. These two polymers are designated Polymer I and Polymer II. Polymer I, preferably an anionic polymer, is water soluble and in its salt form (NaA), the sodium salt in this case. The monomer of Polymer II preferably is cationic, and preferably is also water soluble and in its salt form. The two polymers are connected or bonded by ionic interactions to form the IPN. The IPN is used to form fibers, which are in turn used to form the filter tow which, upon disposal following use, is sufficiently water soluble to biodegrade.

The starting materials, i.e., the Polymer I salt and the Polymer II salt may be provided in monomer form or in relatively low molecular weight (MW) form as required to form the desired IPN.

Suitable polymers and the (sodium) salt for the Polymer I include:

| | | | |
|---|---|---|---|
| PAA | Poly(Acrylic Acid) | NaPA | Sodium Poly(acrylate) |
| PMA | Poly(Methacrylic Acid) | NaPMA | Sodium Poly(methacrylate) |
| PSSA | Poly(Styrene Sulfonic Acid) | NaPSS | Sodium Poly(styrenesulfonate) |
| PESA | Poly(Ethylene Sulfonic Acid) | NaPES | Sodium Poly(ethylenesulfonate) |
| PVSA | Poly(Vinyl Sulfuric Acid) | NaPVS | Sodium Poly(vinylsulfonate) |
| PVPSA | Poly(Vinylphenyl Sulfuric Acid) | NaPVSA | Sodium Poly(vinylphenylsulfonate) |
| PVPAA | Poly(1-Vinylpyrrolidone-co-Acrylic | NaPAA | Sodium Poly(1-Vinylpyrrolidone- |

| | Acid) | | acrylate) |
|---|---|---|---|
| PGA | Poly(Glutamic Acid) | NaGA | Sodium Poly(glutamate) |
| PEI | Poly(Ethyleneimine Acid) | NaEI | Sodium Poly(ethyleneimate) |
| PAAM | Poly(Acrylic Acid-co-Maleic Acid) | NaAAM | Sodium Poly(acrylate-co-maliate) |

Suitable polymers and the chloride salt for the Polymer II include:

| PEI | Poly(Ethyleneimine) | PEI HCl | Poly(Ethyleneimine Hydrochloride) |
|---|---|---|---|
| P2VP | Poly(2-vinylpryidine) | P2VP HCl | Poly(2-vinylpryidine Hydrochloride) |
| PVAm | Poly(Vinylamine) | PVAm HCl | Poly(Vinylamine Hydrochloride) |

Poly(1-Vinylpyrrolidone-co-2 Dimethylaminoethyl Methacrylate), quantenized
Poly(4-Vinylpyridinium p-Toluenesulfonate)
Poly(Sodium 4-Styrenesulfonate)
Poly-DL-Lysine Hydrobromide
Poly(Diallydimethylammonium Chloride)
Poly-D-Alinine The sodium and hydrochloride salts are preferable. Other salts could be used, such as calcium and HBr. The preferred case is where the Polymer I salt is sodium and the Polymer II salt is chloride, such that the by-product formed, and possibly precipitated out, is NaCl, which is water soluble and easily removed and disposed. Once the fibrous material has been isolated or formed (as discussed below), it may be rinsed and/or washed, preferably in cold water, to remove any trapped NaCl or other salt. Cold water should preferably be used to prevent the filter from being "resolubilized", i.e., to prevent significant dissolving of the IPN.

It is not necessary to use a completely functionalized polymer. For example, instead of using NAPSS, which has one sulfonate group each repeat unit, we could use $[-(NaPSS)_{1-x}-(PS)_x]$, where $0 \leq x < 1$. If $x=0$, the polymer would be NAPSS. The incompletely functionalized polymer could be used to adjust the ionic interactions involved in forming the IPN, thus altering the structural and physical properties of the filter. Thus, this can be used to further customize the filter to fit the needs for its intended use.

Synthetic preparation of starting materials will probably not be necessary. Should it be, the steps to make the staring materials will be very simple and cost effective. Most, if not all of the polymers can be purchased from Aldrich (Milwaukee, Wis.).

The ratio of the polymers is chosen based on the molecular weight of the repeat unit, as well as the charge of each repeat unit. Consider the following example. Polymer I is NAPSS, whose molecular weight per unit is 206 g/mol. Polymer II is PEI.HCl, whose molecular weight per unit is 79. Since they do not have the same molecular weight, and since they have the same charge ±1, a ratio of the weights must be employed, in this case 206/79, or approx. 2.6 times more by weight of the Polymer I, NAPSS, to that of the Polymer II, PEI.HCl. Alternatively, it may be advantageous to provide the Polymer I and Polymer II in a ratio other than 1:1 molar basis relative to charge. For example, if either Polymer I or Polymer II were provided in about 5% excess, it may lead to improved manufacturing (e.g., driving the ionic reaction to completion) or to an interaction with smoke components, possibly occluding the smoke components in the filter.

Using a 10–35 weight percent solution in water of Polymer I and 10–35 weight percent in water of Polymer II, based upon the molecular weight, they are added at the same rate to mixture vessel containing a stirring apparatus. Alternatively, one polymeric solution can be added to a vessel which contains the other polymeric material. In either case, the resulting IPN consisting of a Polymer I/Polymer II complex will do one of the following things: (1) Fall out of solution (precipitate) or (2) remain in the water solution (soluble). If the material falls out (precipitates), a lower weight percentages solutions should be employed. However, with the resulting IPN being soluble in water, the water can be removed and the resulting material can be isolated.

The charge density on the polymers (polyelectrolytes) used has a bearing on the formation, structure, and the properties of the resulting IPNs and can be altered to fill the needs for intended uses. IPNs formed from polymers with low charge densities generally dissociate more easily, while those formed with polymers having high charge density are generally more stable.

The pH of the aqueous solution containing the polymers may be advantageously altered to meet specific manufacturing needs. For example, IPNs may be formed by complexing polyacrylic acid (PAA) and branched polyethyleneimine (PEI) via ionic bonds at neutral pH. However, the IPN is practically fully soluble in alkaline media, and the salt bonds are fully disrupted in strongly acidic media.

The addition of salt may also be used advantageously in the manufacturing of the filter. The ionic interaction of the polymers and subsequently the properties of an IPN can be modified by the addition of completely ionized salts such as Ammonium Hydroxide or Sodium Bi-Carbonate to the aqueous solution containing the IPN. Generally, the addition of salt serves to break or reduce the polymer (polyelectrolyte) ionic bonding.

The temperature of the aqueous solution used in forming the IPN can also be used to adjust the properties of the IPN. The softening point or glass transition temperature may be advantageously set or controlled by selecting the polymers used. The glass transition temperature is the temperature where the polymer goes from a crystalline state to an amorphous state, i.e., structure is still present, but the material is softer. For example, methacrylate polymers have a higher glass transition temperature than acrylic polymers. Generally, the softening point should be higher than the highest temperature experienced while the cigarette is in use.

The molecular weight of the polymers used to form the IPN should be between about 400–800. However, larger or smaller molecular weights can be used. Once the IPN is formed in its aqueous solution, several methods may be used to make fibers and the fibrous tow. Generally, methodologies for making fibrous materials are known to those skilled in the art. Additional fiber forming information is disclosed in *the Encyclopedia of Polymer Science & Engineering*, Mark, Bikales, et al., Vol. 6, "Fibers, Manufacture," pp. 805–827, herein incorporated by reference. As disclosed therein, there are generally three major methods to make fibers: dry spinning, wet spinning and melt spinning. The choice of method employed depends on the nature of the fiber produced. In dry spinning, a polymer solution is extruded from a spinneret through a zone in which the solvent (water here) is rapidly evaporated. Wet spinning is characterized by the extrusion of a polymer solution through a spinneret into a non-solvent media, e.g., a slightly alkaline or acidic solution. The filament can be precipitated without chemical reaction or the fibrous polymer can be regenerated from a soluble derivative such as a salt. Melt spinning is less feasible for the present invention because of the inability of the polymers to withstand the heat used during the manufacturing process.

The tow consists of a plurality of randomly oriented fibers made from the IPN. In a preferred embodiment, the tow is shaped to serve as a cigarette filter. Other uses of the invention will be apparent. The tow may or may not be crimped as desired to meet certain objectives. If the tow has sufficient particulate removal qualities, crimping may not be required. On the other hand, crimping may be desired to aid in the shaping and forming the bulk fiber into a tow for a cigarette filter.

The IPN and the subsequent fiber and tow formation results in a tow having random orientation of the fibers which provides the desired tortuous path. It is desired that the filters have a pressure drop comparable with known filters.

Once the filter is made, a sheath comprised of a PEG, a poly(ethylene glycol) or poly(proplene glycol) is be placed around it. This is to keep the filter from touching the mouth of the smoker. The sheath further allows for the integrity of the filter to be maintained. It also controls the undesired breakdown of the filter. Preferably, the sheath dissolves at a faster rate than the filter. Thus, it will "dissolve" first, allowing for the filter then to be "dissolved." A thin coating, preferably less than about 150 $\mu$, of the material will be employed. The molecular weight of the poly(ethylene glycol) or poly(proplene glycol) polymers used to make the sheath is about 750–2500, more preferably, 1000–1500. However, greater or lesser molecular weights may be used.

The sheath may be designed to provide a preferred recessed tip to help prevent lighting the filter end of the cigarette.

It is desired that the filter not ignite if the wrong end of the cigarette is lit or if the cigarette is smoked to its full extent. Alternatively, the filter may be designed such that if the cigarette is smoked to its full extent, a thermoplastic effect will occur, significantly increasing the pressure drop, such that the user does not inhale the combustion products of the filter.

The strength of the filter is an important design consideration. The starting polymer to develop the IPN will provide the filter with a certain strength. Also, the strength can be adjusted by changing the density of the fiber or by otherwise adjusting the manufacturing conditions as disclosed herein.

The filter of the present invention solves the problems mentioned above by providing a filter that is sufficiently water soluble to biodegrade, thus eliminating the eyesore and environmental problem of improperly disposed used cigarette filters. Also, the inventive IPN provides a filter which is manufactured using substantially aqueous solution which is substantially free of volatile organic compound solvents. Thus, the present invention overcomes the shortcomings of the prior art filters which are manufactured using organic solvents that cause health and environmental concerns.

The filter as described herein can be used for any suitable filtering device including, but not limited to, gas masks, air filters and tobacco filters.

Although the present invention and its advantages have been described in detail, it should be understood that various changes, substitutions, and alterations can be made therein without departing from the spirit and scope of the invention as defined by the appended claims.

We claim:

1. A method of making a filter, comprising the steps of:
    forming a first aqueous solution which is substantially free of organic solvents, said first aqueous solution comprising an anionic polymer in its salt form;
    forming a second aqueous solution which is substantially free of organic solvents, said second aqueous solution comprising a cationic polymer in its salt form;
    contacting the first aqueous solution and the second aqueous solution to ionically interact the anionic polymer and cationic polymer to form a an interpenetrating polymer network;
    forming fibers from the interpenetrating network;
    arranging the fibers in a random orientation to form a tow;
    wherein the filter is sufficiently water soluble to biodegrade.

2. The method of claim 1,
    wherein a soluble salt is formed by ionic interaction of the anionic polymer in its salt form and cationic polymer in its salt form, and
    further comprising the step of washing the formed fibers with cold water to remove the soluble salt, the water being at a sufficiently cool temperature to prevent significant dissolving of the formed fibers.

3. The method of claim 1, wherein the filter is designed for use as a cigarette filter.

4. The method of claim 1, wherein the anionic polymer and the cationic polymer each have a molecular weight range from about 400 to about 800.

5. The method of claim 1, wherein the anionic polymer and the cationic polymer each have a preferred molecular weight range of 400 to 600.

6. The method of claim 1, wherein the anionic polymer is selected from the group consisting of Poly(Acrylic Acid), Poly(Methacrylic Acid), Poly(Styrene Sulfonic Acid), Poly (Ethylene Sulfonic Acid), Poly(Vinyl Sulfuric Acid), Poly (Vinylphenyl Sulfuric Acid), Poly(1-Vinylpyrrolidone-co-A crylic Acid), Poly(Glutamic Acid), Poly(Ethylenimine Acid) and Poly(Acrylic Acid-co-Maleic Acid).

7. The method of claim 1, wherein the cationic polymer is selected from the group consisting of Poly (Ethyleneimine), Poly(2-vinylpyridine), Poly(Vinylamine), Poly(1-Vinylpyrrolidone-co-2 Dimethylaminoethyl Methacrylate), quantenized Poly(4-Vinylpyridinium p-Toluenesulfonate), Poly(Sodium 4-Styrenesulfonate), Poly-DL-Lysine Hydrobromide, Poly (Diallydimethylammonium Chloride), and Poly-D-Alinine.

8. The method of claim 1, further comprising:
    a sheath surrounding the fibers comprised of poly (ethylene glycol) or poly(proplene glycol).

9. The method of claim 8, wherein the sheath is water soluble at a rate faster than the fibers are water soluble.

10. The method of claim 8, wherein the sheath is made from poly(ethylene glycol) or poly(proplene glycol) polymers having a molecular weight range from about 750 to about 2500.

11. The method of claim 8, wherein the sheath is made from poly(ethylene glycol) or poly(proplene glycol) polymers having a preferred molecular weight range from 1000 to 1500.

* * * * *